United States Patent [19]

Burke et al.

[11] Patent Number: 4,737,978
[45] Date of Patent: Apr. 12, 1988

[54] NETWORKED CELLULAR RADIOTELEPHONE SYSTEMS

[75] Inventors: Michael Burke, Lake Zurich; Ken Felix, Crystal Lake; Daniel Tell, Deerfield; James Williams, Lombard, all of Ill.

[73] Assignee: Motorola, Inc., Schaumburg, Ill.

[21] Appl. No.: 925,427

[22] Filed: Oct. 31, 1986

[51] Int. Cl.⁴ .............................................. H04B 1/00
[52] U.S. Cl. .......................................... 379/60; 455/33
[58] Field of Search ...................... 379/59, 60; 455/33, 455/34, 54

[56] References Cited

U.S. PATENT DOCUMENTS

| | | | |
|---|---|---|---|
| 4,485,486 | 11/1984 | Webb et al. | 455/33 |
| 4,556,760 | 12/1985 | Goldman | 179/2 EB |
| 4,578,815 | 3/1986 | Persinotti | 455/15 |
| 4,613,990 | 9/1986 | Halpern | 455/33 |
| 4,628,152 | 12/1986 | Akerberg | 379/59 |
| 4,644,351 | 2/1987 | Zabarsky | 340/825.44 |
| 4,670,899 | 6/1987 | Brody et al. | 379/60 |
| 4,670,905 | 6/1987 | Sanovos et al. | 455/33 |
| 4,670,906 | 6/1987 | Thro | 455/56 |
| 4,696,051 | 9/1987 | Breeden | 455/13 |
| 4,700,374 | 10/1987 | Bini | 379/60 |
| 4,704,733 | 11/1987 | Kawano | 455/16 |

OTHER PUBLICATIONS

"Capacity Dynamics in Cellular Mobile Telephone Sytems", by Jim Williams Telecommunications, Feb. 1983, pp. 32-39.

Motorola Instruction Manual No. 68P81150E06-O, "Dynatac Call Flow", by Motorola, Inc., 1983, pp. 1-11.

*Primary Examiner*—Robert Lev
*Attorney, Agent, or Firm*—Rolland R. Hackbart

[57] ABSTRACT

Adjacent cellular systems (101-103) are interconnected to form a network providing telephone coverage to mobiles located throughout their combined coverage areas (111-113). Each networked cellular system (101-103) includes base sites (412, 414, 416) located in cells (402, 404, 406) and a control terminal (420) coupled by data and voice lines to the base sites, a telephone central office (422) and the other cellular systems. Each base site (402, 404, 406) includes a base site controller 950, a scanning receiver 910, signalling transceiver 912 and up to eight voice channel transceivers (901-908). As mobiles move about the networked coverage area (111-113), intrasystem handoffs are provided between cells of the same cellular system, and intersystem handoffs are provided between border cells of adjacent cellular systems if intrasystem capacity is not available. Mobiles are paged throughout the networked coverage area (111-113) starting in the coverage area (111-113) in which the mobile last registered. Mobiles automatically register in response to receipt of the overhead message train when moving between coverage areas (111-113).

14 Claims, 12 Drawing Sheets

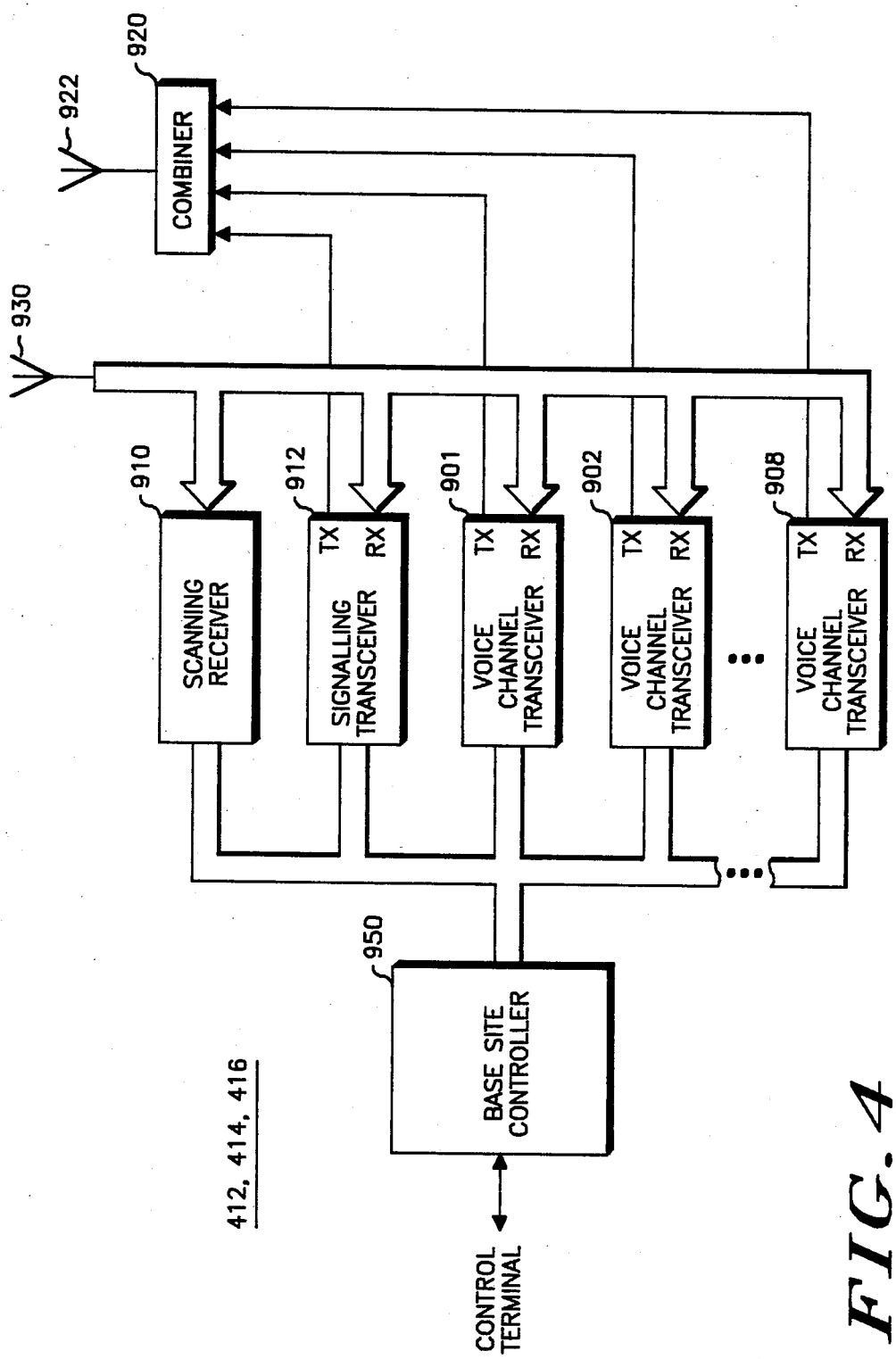

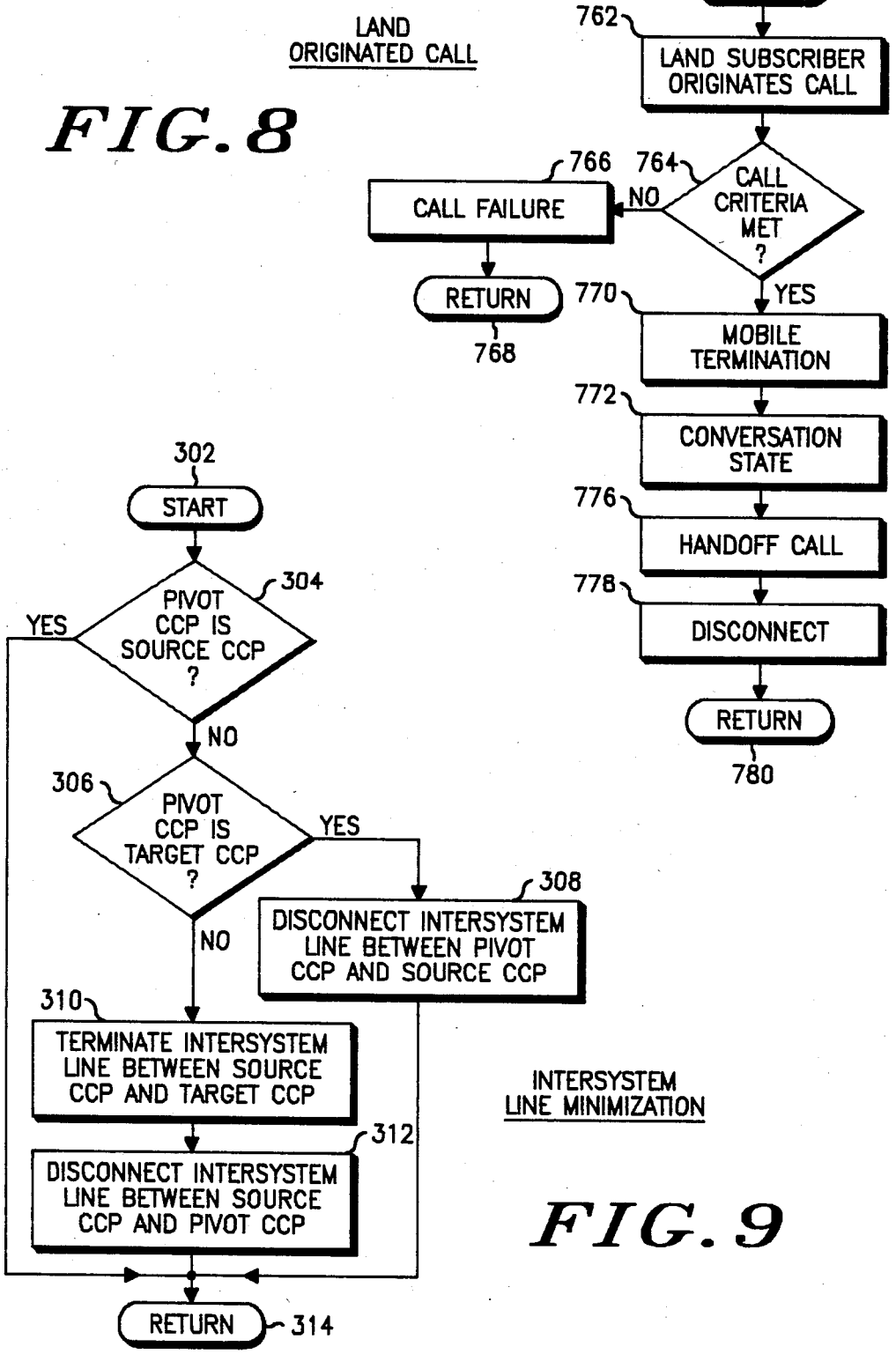
FIG. 8 — LAND ORIGINATED CALL
FIG. 9 — INTERSYSTEM LINE MINIMIZATION

1300 OVERHEAD MESSAGE TRAIN
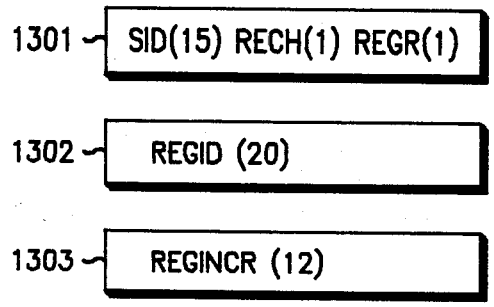
*FIG. 13*
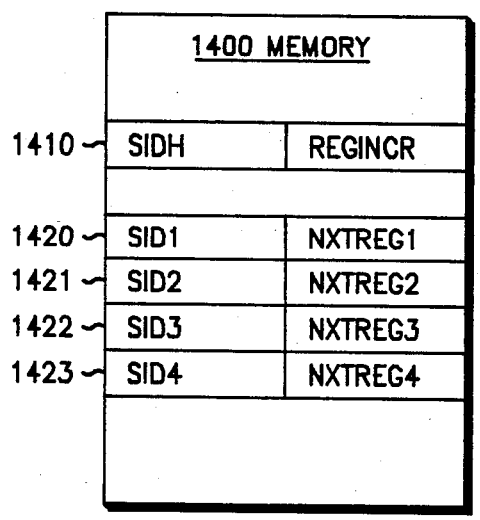
*FIG. 14*
*FIG. 15*
1500 DIRECTED RETRY MESSAGE
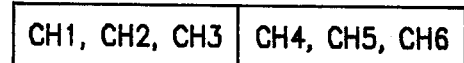

NETWORKED CELLULAR RADIOTELEPHONE SYSTEMS

BACKGROUND OF THE INVENTION

The present invention generally relates to radiotelephone communication systems and more specifically to a method and apparatus for networking multiple cellular radiotelephone systems each covering adjacent geographical areas.

Mobile radiotelephone service has been in use for some time and traditionally has been characterized by a central site transmitting by way of high-power transmitters to a limited number of mobile or portable transceivers in a large geographic area. Mobile and portable transmissions, due to their lower power transmitters, were generally received in previous systems by a network of satellite receivers remotely located from the central site for receiving and relaying mobile and portable transmissions to the central site for processing. In previous systems only a limited number of radio channels were available, thus limiting the number of radiotelephone conversations in an entire city to the specific number of available channels.

Modern cellular radiotelephone systems have a comparatively large number of radio channels available which, further, can be effectively multiplied by reuse of the radio channels in a metropolitan area by dividing the radio coverage area into smaller coverage areas (cells) using low power transmitters and coverage restricted receivers. Such cellular systems are further described in U.S. Pat. Nos. 3,906,166 and 4,268,722. The limited coverage area enables the radio channels used in one cell to be reused in another cell geographically separated according to a predetermined plan, such as a four cell pattern shown and described in U.S. Pat. No. 4,128,740. In this four cell pattern, each cell is assigned a subset of the available radio channels and reuse of the radio channels is accomplished by repeating the pattern throughout a metropolitan area.

A cell system typically utilizes a pair of radio frequencies for each radio channel in each cell. Each cell is assigned at least one signalling channel (also called control or access channel) and several voice channels. The signalling channel is selected or dedicated to receive requests for service from mobiles and portables, to page selected mobiles or portables, and to instruct the mobiles or portables to tune to a voice channel where a conversation may take place. This signalling channel is continuously assigned the task of receiving and transmitting data to control the actions of the mobiles and portables. The data message and radio channel specifications for U.S. cellular radiotelephone systems are set forth in Electronic Industries Association (EIA) Interim Standard CIS-3 implemented in accordance with 47 CFR 22 and the Report and Orders pertaining to Federal Communications Commission Docket 79-318. Copies of EIA Interim Standard CIS-3 may be obtained from the Engineering Department of the Electronic Industries Association at 2001 Eye Street, N.W., Washington, D.C. U.S.A. 20006.

Since the cells may be of relatively small size, the likelihood of a mobile or portable travelling out of one cell and into another cell is high. The process of switching the established call from one cell, the source cell, to another, the target cell, is known as handoff. The cellular system determines the need for a handoff by periodically measuring the signal strength of each active mobile or portable. If the measured signal strength is below a predetermined level, the cellular system determines the availability of other channels in neighboring target cells and composes an instruction to the mobile or portable commanding it to tune to an available channel in an acceptable target cell.

As more cellular systems are installed, intersystem handoff between different cellular systems will be required in order to maintain a call as the mobile or portable passes from the coverage area of one system to another. Intersystem handoffs are complicated by the fact that adjacent or colocated cellular systems may be operated by different entities. As a result, each intersystem handoff must be coordinated not only between commonly-owned cellular systems but also between competing cellular systems. Accordingly, there is a need for an improved method and apparatus for networking adjacent cellular systems in order to facilitate intersystem handoff.

SUMMARY OF THE INVENTION

Therefore, it is an object of the present invention to provide an improved method and apparatus for networking adjacent cellular systems.

It is a further object of the present invention to provide an improved method and apparatus for controlling intersystem handoff of radiotelephones moving between adjacent cellular systems.

Briefly described, the present invention encompasses an improved method of controlling handoff of radiotelephones moving from source cells of one radiotelephone system toward an adjacent radiotelephone system. Each radiotelephone system has a plurality of cells for providing radiotelephone service to a corresponding geographical area. Each cell has a plurality of radio channels and a radio coverage area established by fixed site radio apparatus. Each radiotelephone is capable of being handed off from one cell to another. The unique method comprises the steps of: requesting a handoff in a source cell when the radiotelephone signal strength is less than a predetermined signal strength; identifying adjacent cells when a handoff is requested; determining if one of the identified adjacent cells is available for handoff; determining if the adjacent radiotelephone system is available for handoff if one of the identified adjacent cells is not available; and executing a handoff to the available one of the identified adjacent cells and the adjacent radiotelephone system.

BRIEF DESCRIPTION OF THE DRAWINGS

FIG. 4 is a block diagram of the base sites in FIG. 2.

FIG. 8 is a flow diagram executed by the control terminal in FIG. 2 for processing a land originated call in a cellular system networked with at least one other cellular system.

FIG. 9 is a flow diagram executed by the control terminal in FIG. 2 for minimizing intersystem lines for calls in a cellular system networked with at least one other cellular system.

FIG. 13 is a diagram of the overhead message train (OMT).

FIG. 14 is a diagram of a portion of the mobile and portable memory.

FIG. 15 is a diagram of the directed re-try message.

DETAILED DESCRIPTION OF THE PREFERRED EMBODIMENT

Figure 1:
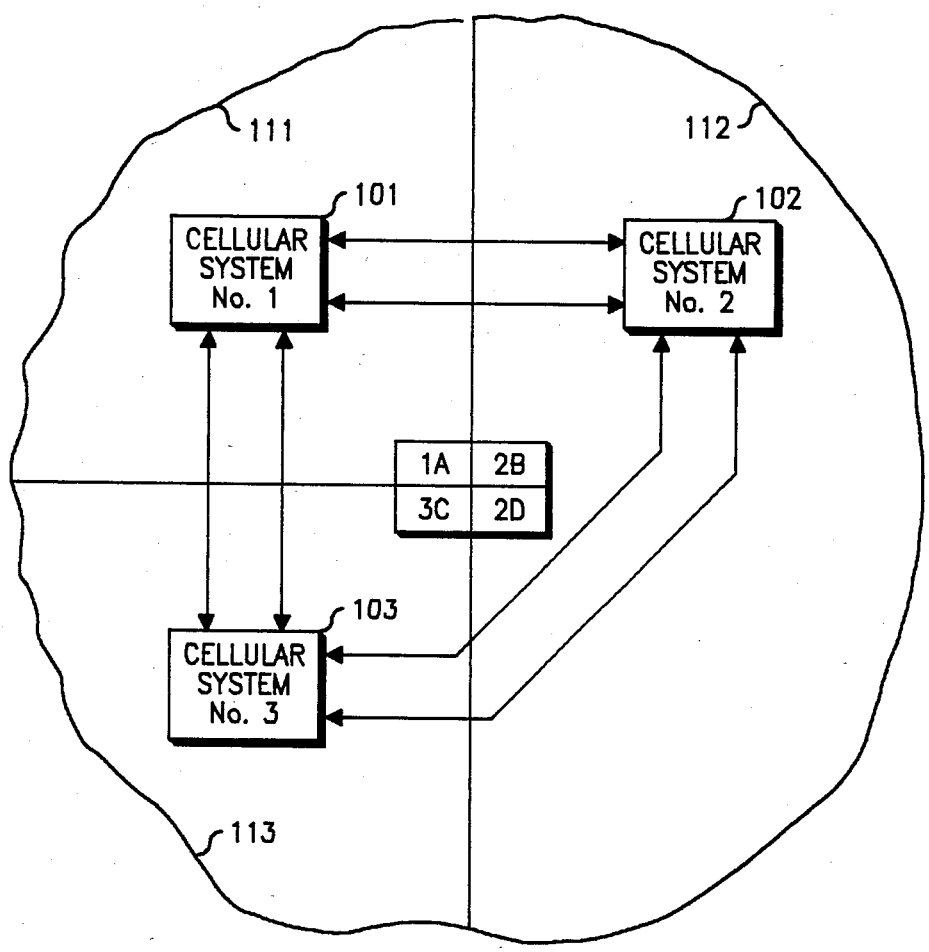
FIG. 1 is a block diagram of three networked cellular systems showing their respective coverage areas and illustrative border cells.

In FIG. 1, there is illustrated three networked cellular systems 101–103, each having a corresponding coverage area 111–113 and illustrative border cells 1A, 2B and 2D, and 3C, respectively. Cellular systems 101–103 may be owned by one entity or different entities. Each system 101–103 is coupled to the other by a network of data and voice lines for communicating data messages and interconnecting intersystem telephone calls, respectively. This network of data and voice lines may be implemented by dedicated lines or may be routed through the existing landline telephone network. Whenever mobiles or portables pass between border cells, such as, for example, 1A and 2B or 1A and 3C, an intersystem handoff may be required. By utilizing the present invention, intersystem handoffs are minimized since an intersystem handoff of a call is allowed only if an adjacent cell in the same cellular system is not available. As a result, call revenues of a cellular operator are maximized by assigning a higher priority to intrasystem handoffs than to intersystem handoffs.

Figure 2:
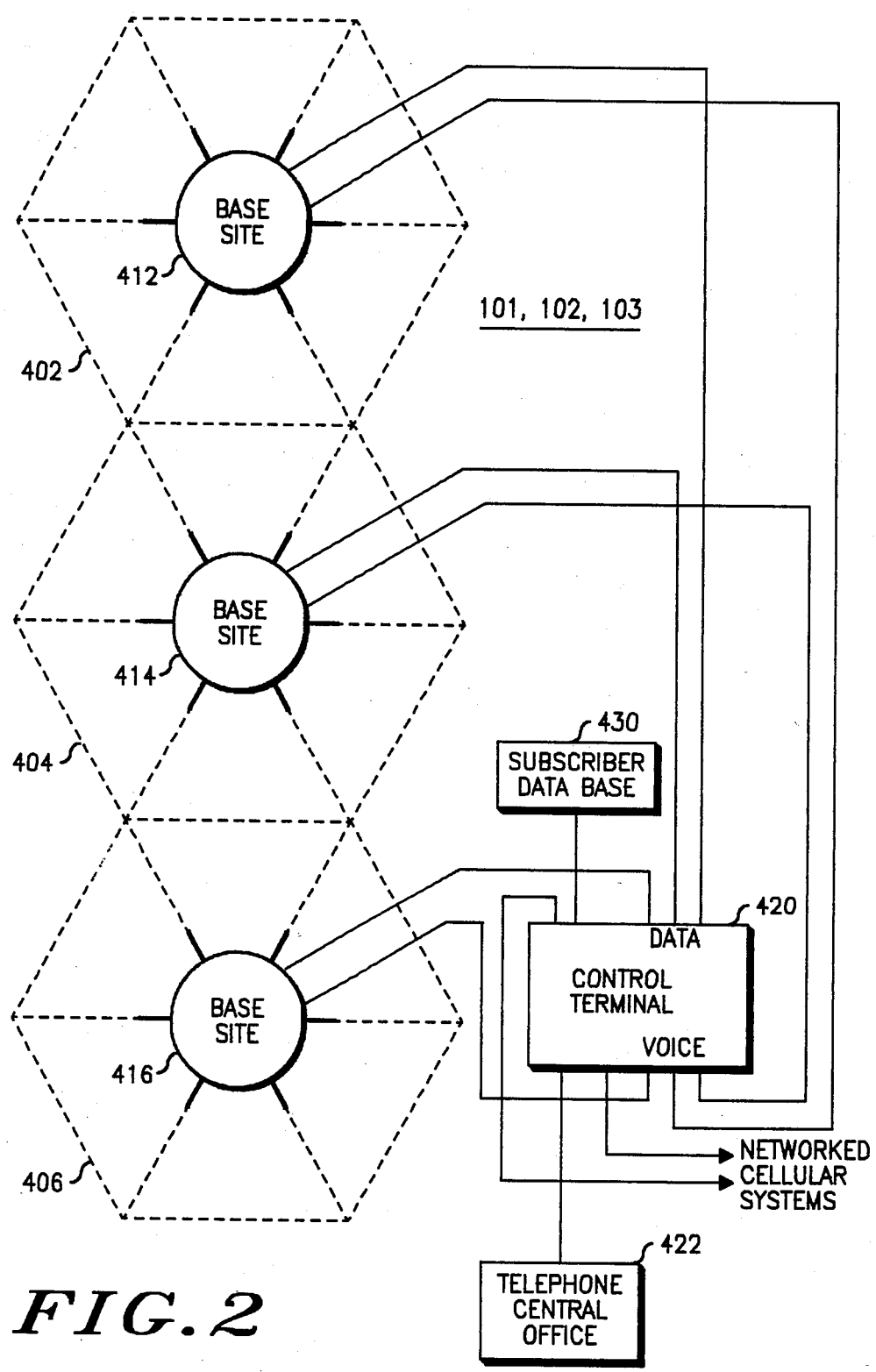
FIG. 2 is a block diagram of the equipment which would be employed in a conventional center illuminated sector cellular system.

Referring now to FIG. 2, there is illustrated a block diagram of cellular systems 101–103 in FIG. 1. Such cellular systems 101–103 are further described in U.S. Pat. Nos. 3,906,166 and 4,268,722 each assigned to the assignee of the present invention and incorporated herein by reference and in an experimental cellular radiotelephone system application filed under FCC Docket No. 18262 with the Federal Communications Commission by Motorola and American Radio-Telephone Service, Inc., in February 1977. Such cellular systems provide telephone coverage to both mobiles and portables located throughout a large geographical area. Portables may be radiotelephones of the type described in U.S. Pat. Nos. 4,486,624, 3,962,553 and 3,906,166 each assigned to the assignee of the present invention and incorporated herein by reference; and mobiles may be radiotelephones of the type described in Motorola instruction manual number 68P81039E25, published by Motorola Service Publications, Schaumburg, Ill., in 1979. Both mobiles and portables are commercially available in the U.S. from a number of suppliers. To avoid repetition, the word "mobile" will be used hereinafter to mean mobile or portable, and likewise "mobiles" to mean mobiles, portables, or mobiles and portables. Although FIG. 2 shows three center-illuminated sector cells, it is obvious that a person skilled in the art may be able to apply the essence of the present invention to other types of cellular configurations such as, for example, omnidirectional-illuminated or corner-illuminated cellular configurations.

As illustrated in FIG. 2, the geographical area is subdivided into cells 402, 404, and 406 which are illuminated with radio frequency energy from base sites 412, 414 and 416. Each base site 412, 414 and 416 is coupled by data and voice lines to a radiotelephone control terminal 420 which may be similar to the terminals described in aforementioned U.S. Pat. Nos. 3,906,166 and 4,268,722. These data and voice lines may be provided by dedicated wire lines, pulse code modulated carrier lines, microwave radio channels, or other suitable communication links. Control terminal 420 may also be coupled by data lines to a remote subscriber data base 430 which includes subscriber identification and billing information or may include its own subscriber data base. Control terminal 420 is also coupled to the existing telephone network via a conventional telephone central office 422 for completing telephone calls between mobiles and landline telephones.

Figure 3:
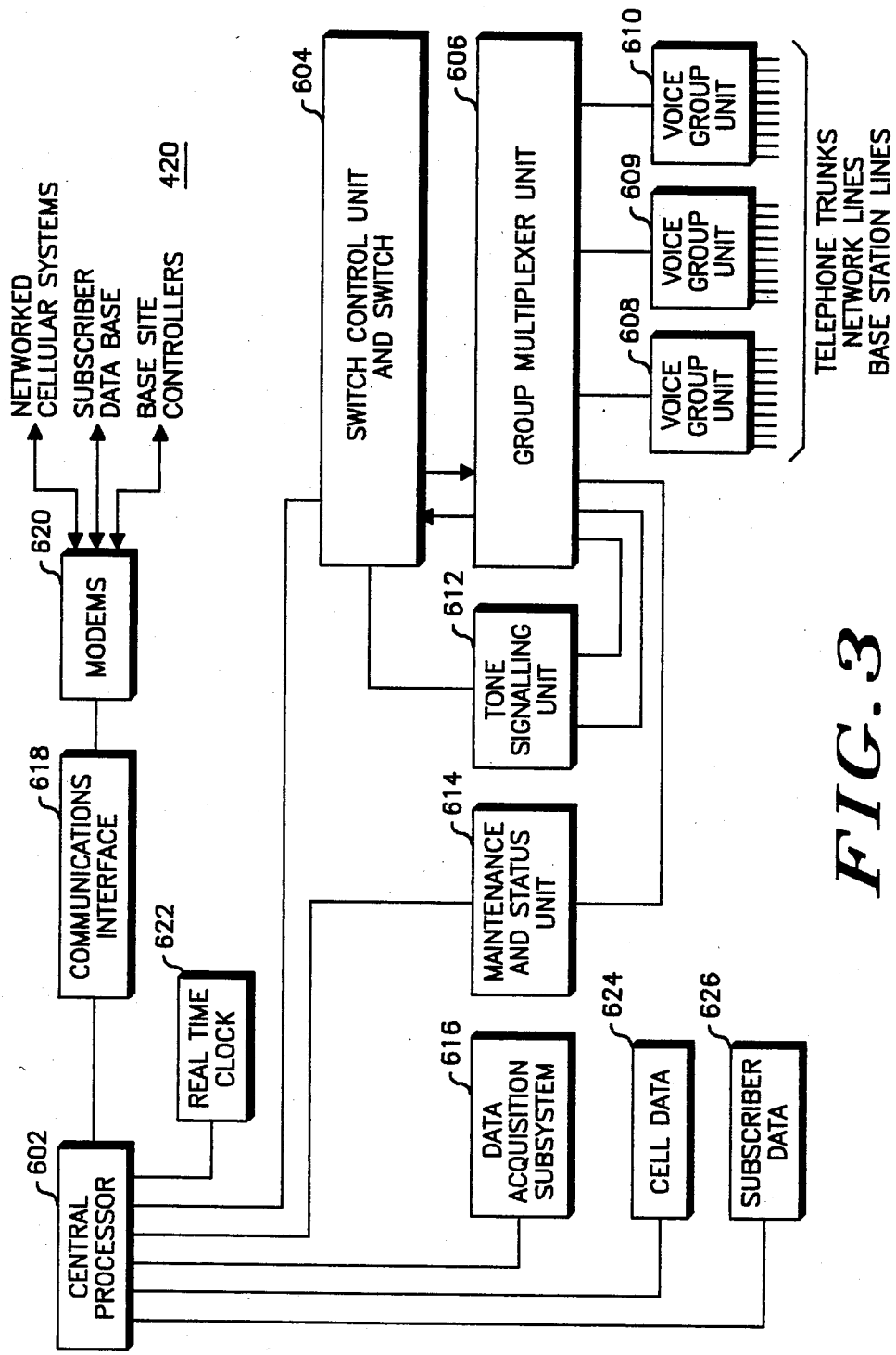
FIG. 3 is a block diagram of the control terminal in FIG. 2.

A functional block diagram of a typical control terminal 420 is shown in FIG. 3. This control terminal may be an EMX100 available from Motorola, Inc. or any other suitable commercially available equivalent. Basically, the control terminal consists of a central processor (CCP) 602, a switch control unit and switch 604, group multiplexer unit 606, voice group units 608–610, tone signalling unit 612, maintenance and status unit 614, data acquisition subsystem 616, communications interface 618, modems 620, real-time clock 622, cell data base 624 and subscriber data base 626. Cell data base 624 includes data identifying border cells, adjacent cells and lists of signalling channels for directed retrys. Subscriber data base 626 includes data identifying valid subscriber identification numbers and other subscriber related information. Communications over the data lines to each BSC, networked cellular system and a remote subscriber data base may be accomplished via conventional 4800 bit per second modems 620. The communications protocol is preferably a version of the conventional Advanced Data Communications Control Procedures (ADCCP).

The interconnection between control terminal 420 and the base sites 402, 404 and 406 is further shown in FIG. 4. The interconnection may be on a line per channel basis or a PCM group basis. Either type of interconnection is well known in the art. A separate data line, such as, for example, a standard telephone line or other communications link capable of carrying 4800 baud data, is extended between the control terminal 420 and each base site 402, 404 and 406.

Referring to FIG. 4, each of the base site 412, 414, and 416 includes a BSC 950, a scanning receiver 910, a signalling transceiver 912 for operating on at least one duplex signalling channel, a plurality of voice channel transceivers 901–908 for operating on corresponding duplex voice channels, receiving antennas 930 and transmitter combiner 920 and transmitter antenna 922.

Voice channel transceivers 901-908 may be located substantially at the center of each of the corresponding cells 402, 404, and 406. The transmitters of signalling transceiver 912 and voice channel transceivers 901-908 may be combined by conventional combiner 920 onto one omni-directional antenna 922, while the signalling receiver 912 and receivers of voice channel transceivers 901-908 and scanning transceiver 910 may be selectively intercoupled to two or more directional or omni-directional antennas 930. Alternatively, in other conventional embodiments, each transmitter of signalling transceiver 912 and voice channel transceivers 901-908 may also be coupled to two or more directional antennas. The base site equipment in FIG. 4 and its operation is described in further detail in the instant assignees copending patent application Ser. No. 829,872, filed Feb. 18, 1986, entitled "Method and Apparatus for Signal Strength Measurement and Antenna Selection in Cellular Radiotelephone Systems", invented by Barry J. Menich et al. and incorporated herein by reference. Furthermore, the base site equipment illustrated in FIG. 4 is commercially available from Motorola, Inc. and employs transceivers of the type described in Motorola Instruction Manual No. 68P81060E30, published by Motorola Service Publications, 1301 East Algonquin Road, Schaumburg, Ill., in 1982.

In FIG. 4, antennas 930 may be implemented with six 60° sector antennas. Each sector antenna 930 primarily covers a portion of a cell as shown in dashed lines in FIG. 2 and typically has a coverage area that overlaps the coverage area of adjacent sector antennas. Since the signalling channel generally requires an omni-directional receiving pattern, the signals received by the six sector antennas 930 may be combined in signalling transceiver 912 by means of a maximal ratio predetection diversity combiner, as illustrated and described in U.S. Pat. Nos. 4,369,520 and 4,519,096 each assigned to the assignee of the present invention and incorporated herein by reference. Furthermore, signalling transceiver 912 may provide coverage of a portion of a cell by selectively combining the signals received by two or more of the sector antennas 930. The sector antennas 930 and associated receiving apparatus may be of the type shown and described in U.S. Pat. Nos. 4,101,836 and 4,317,229 each assigned to the assignee of the present invention and incorporated herein by reference.

Because the voice channel transceivers 901-908 of the preferred embodiment may be selectively programmed to any radio channel, each transceiver 901-908 may be used interchangeably as a scanning receiver, voice channel transceiver, or signalling channel receiver. This fact allows BSC 950 to be relieved of the task of making and controlling the process of signal strength measurement and supervisory audio tone detection thereby making possible the use of available voice channel transceivers 901-908 as scanning receivers when a handoff measurement request (HOMR1) is received from control terminal 420. The available transceiver 901-908 takes cell site characteristics that are downloaded from BSC 950. The downloaded information is the cell type in which the available transceiver 901-908 is being operated (eg., omni or sector) and what kind of function it is to perform in the system (eg., voice channel transceiver, scanning receiver, or signalling transceiver). Also, the available transceiver 901-908 used for scanning is capable of queueing several handoff measurement requests, executing them, and queueing the results for later processing by BSC 950.

Handoff measurement requests (HOMR1) that come from a source BSC to a target BSC are queued automatically and are run as soon as possible. The only reason that a handoff measurement request (HOMR1) would not run immediately is that it would have to wait for a current handoff request to finish execution. Included within the handoff measurement request (HOMR1) are the source signal strength, an optional signal strength offset, the source voice channel frequency and the source supervisory audio tone frequency. When the handoff measurement is run, target BSC compares the source BSC signal strength plus the optional signal strength offset to its measured signal strength and provides a response (HOMRS) if the measured signal strength is greater than the source BSC signal strength plus the optional signal strength offset. Included within the handoff measurement response (HOMRS) is the signal strength measured by target BSC. Otherwise, target BSC does not respond. The handoff measurement task run by target BSC is described in further detail in the aforementioned U.S. patent application Ser. No. 829,872.

Figure 5A:
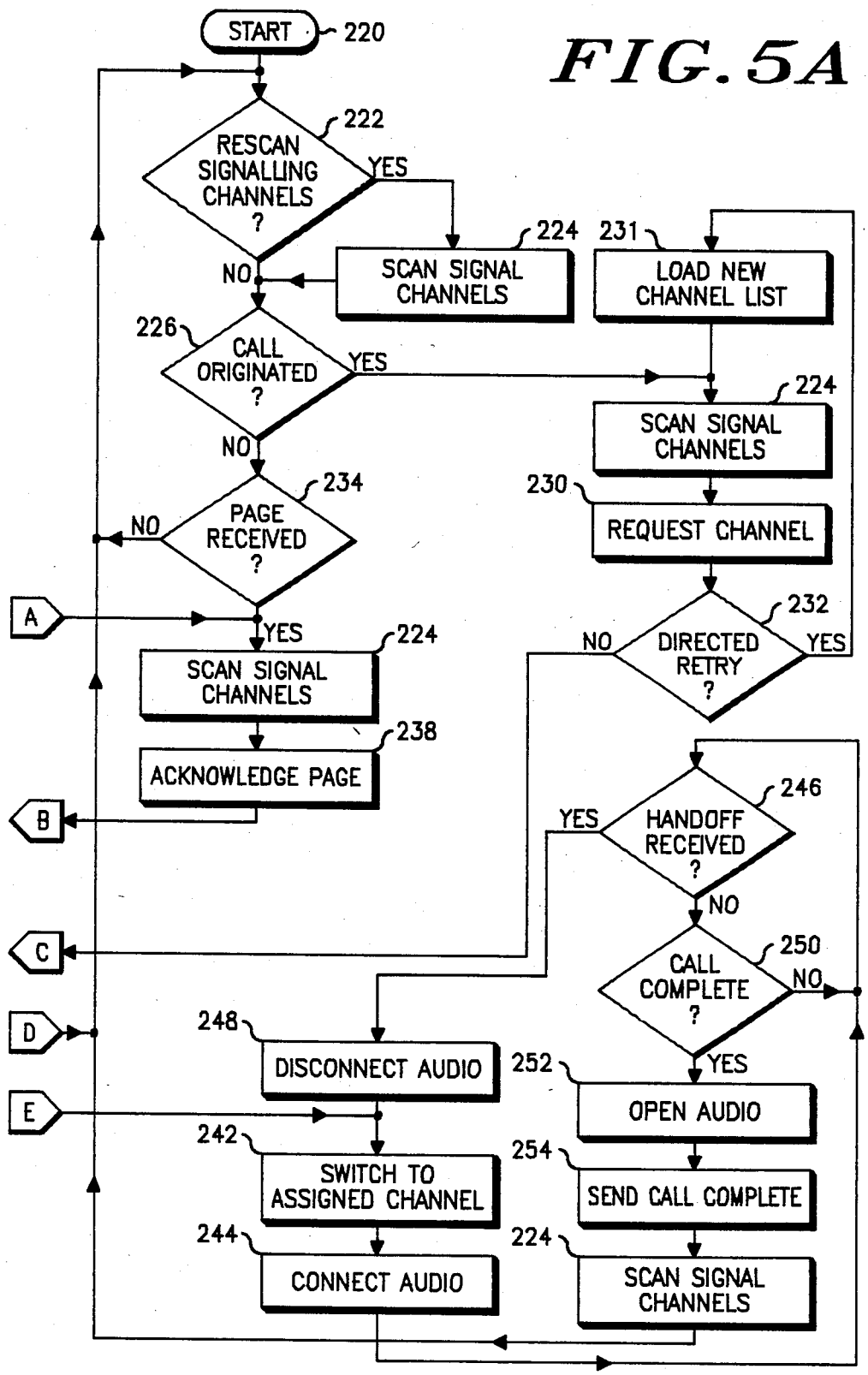
FIG. 5 is a flow diagram executed by a mobile or portable for receiving or initiating calls in a cellular system networked with at least one other cellular system.
Figure 5B:
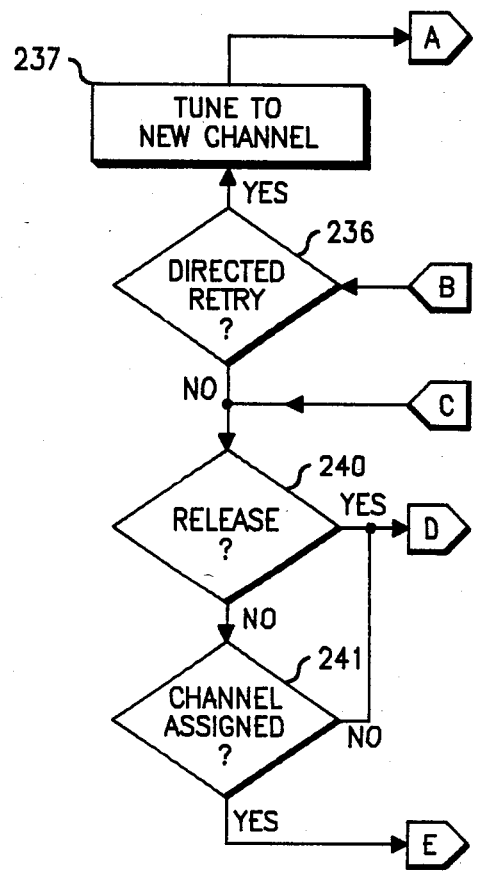

Referring to FIG. 5, there is illustrated a flow diagram executed by mobiles for receiving or initiating calls in a networked cellular system. The process in FIG. 5 is entered at START block 220 when the mobile is turned on. At decision block 222, turn on is detected and YES branch is taken to block 224 where the mobile scans a predesignated group of twenty-one signalling channels.

Figure 6:
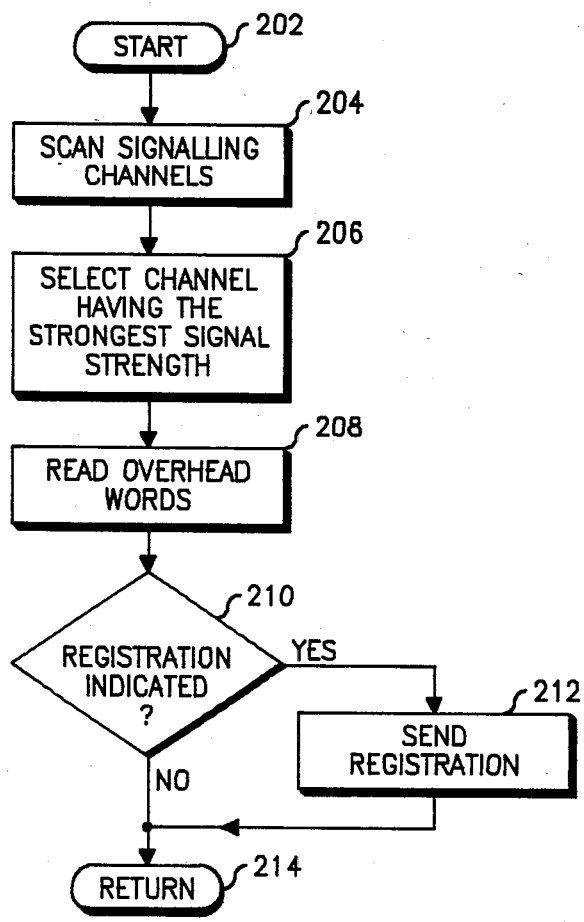
FIG. 6 is a flow diagram executed by a mobile or portable for scanning the signalling channels in a cellular system networked with at least one other cellular system.

The mobile scanning process is shown in further detail in FIG. 6. Entering at START block 202 and proceeding to block 204, a pre-selected group of the twenty-one signalling channels are scanned. Next, at block 206, the mobile selects the signalling channel in the pre-selected group from which has the strongest signal strength. The mobile then tunes to the selected signalling channel. At block 208, the mobile reads the overhead message train (OMT) on the selected signalling channel. The overhead words inform the mobile how the system is configured and how the mobile is to use the system. Referring to FIG. 13, the OMT 1300 is transmitted on signalling channels throughout the cellular system service area, nominally once each second, and includes a system parameter message SID, RECH and REGR 1301 plus, optionally, several other messages of which the registration ID message REGID 1302 and the registration increment message REGINCR 1303 are relevant to the mobile registration process.

Returning to decision block 210, a check is made to determine if registration is indicated. Mobile registration is the process by which a mobile unit becomes listed as being present in the service area of one of the networked cellular systems 101-103 in FIG. 1. Mobile registration procedures are controlled by the provisions of the relevant "Compatibility Specification" for cellular systems. In the U.S., this is the EIA Interim Standard IS-3-C, June 1986. Copies of EIA Interim Standard IS-3-C may be obtained from the Engineering Department of the Electronic Industries Association at 2001 Eye Street, N.W., Washington, D.C. U.S.A. 20006.

The purpose of registration is to permit calls to a mobile to be automatically delivered, even though the mobile may be moving from place to place through the cellular system. Registration may be enabled or disabled individually for each class of mobile, e.g. home or roam, by means of control bits REGH and REGR in the system parameter overhead message 1301 in FIG. 13. Message 1301 also contains the identification of the serving cellular system (SID) by means of which the mobile determines whether it is a "home" or a "roam" mobile. Each mobile contains, in its internal memory 1400 shown in FIG. 14, an entry 1420 indicating its home cellular system (SIDH) and entries 1420-1423 indicating the four cellular systems (SID1-SID4) in which it most recently registered successfully, along with a value for each cellular system (NXTREG) used to determine when it is scheduled to re-register.

Cellular system access for registration purposes may occur only in response to a registration ID message 1302 which may be included periodically in the OMT. The registration ID message 1302 contains a field, REGID, which may be incremented regularly. A particular mobile will respond to a specific registration ID message 1302 if both registration is enabled and either the mobile is not currently registered in the system (SID is not one of the four entries in the mobile's internal memory), or the value of the REGID 1302 exceeds the value of the NXTREG variable associated with SID in the mobile's registration memory 1400. Each time the mobile registers it updates the NXTREG value by adding the last received value of REGINCR 1303 to the last received value of REGID 1302. The mobile also updates NXTREG for each call origination or page response.

Returning to decision block 210, if registration is indicated, YES branch is taken to block 212 where the mobile sends a registration message and updates the value of NEXTREG stored in its memory 1400. Otherwise, NO branch is taken to block 210 where the mobile returns to the flow diagram of FIG. 5.

Returning to decision block 226 of FIG. 5, a check is made to see if a call is being originated by the mobile subscriber. If not, NO branch is taken to decision block 234, where a check is made to determine if a page has been received on the selected signalling channel. If not, NO branch is taken back to decision block 222 to determine if it is time to scan the signalling channels again. Periodically, the mobile will repeat the scan of the signalling channels to insure that it is monitoring the strongest signalling channel. Once a signalling channel has been selected, the mobile has selected the cell in which it is operating.

Returning to decision block 234, if a page has been received, YES branch is taken to block 224 where the access channels are scanned before acknowledging the page. A page is a data message that informs the mobile that someone is attempting to call the mobile. Then, at block 238, the page is acknowledged on the selected signalling channel. Next, a check is made at decision block 236 to determine if a directed retry message has been received on the selected signalling channel. A directed retry message is sent by BSC 950 to direct a mobile to a list of signalling channels specified in the message. A directed retry message 1500 with six signalling channels CH1-CH6 is shown in FIG. 15. If a directed retry message has been received, YES branch is taken back to block 237, to scan, select and tune to one of the directed signalling channels. Then, at block 238, the page is acknowledged on the selected signalling channel.

Returning to decision block 226, if a call has been originated, YES branch is taken to block 224 where the paging channels are scanned before requesting a voice channel. Then, at block 230, a message is sent on the selected signalling channel requesting a voice channel assignment. Next, at decision block 232, a check is made to determine if a directed retry message has been received on the selected signalling channel. If so, YES branch is taken back to block 231, to scan, select and tune to one of the directed signalling channels. Then, at block 230, another message is sent on the selected signalling channel requesting a voice channel assignment.

Both the cell originated path and the page received path join at block 240 where a check is made to see if a release has been received. If so, YES branch is taken to return to decision block 222. Otherwise, NO branch is taken to decision block 241 to check is a voice channel has been received. If not, NO branch is taken to return to decision block 222. If a voice channel has been assigned, YES branch is taken to block 242, where the mobile tunes its transmitter and receiver to the assigned voice channel and sends a burst of signalling tone (10 Khz) to inform the BSC of its arrival arrival on the voice channel. Audio is connected at block 244 and the call is completed in a similar manner to a conventional landline call.

Next, at decision block 246, a check is made to determine if a handoff has been received. A handoff is a data message informing the mobile to switch to a new voice channel. If a handoff has been received, YES branch is taken to block 248 where the audio path is disconnected. Blocks 242 and 244 are then repeated. When leaving the old voice channel the mobile sends a burst of signalling tone to the old BSC. The old (source) BSC detects the burst of signalling tone and sends source clear message (SC) to the cellular system control terminal 420. The mobile retunes its transmitter and receiver to a new voice channel and transponds the supervisory audio tone. The new BSC detects the supervisory audio tone from the mobile and sends a handoff complete message (HOC) to the cellular system control terminal 420. If a handoff has not been received, NO branch is taken to decision block 250 where a check is made to determine if the call has been completed. If not, NO branch is taken back to decision block 246. If the call has been completed, YES branch is taken to block 252 where the audio path is disconnected. Then, at block 254, a call complete signal is sent, and at block 224, the signalling channels are scanned before returning to decision block 222.

Figure 7:
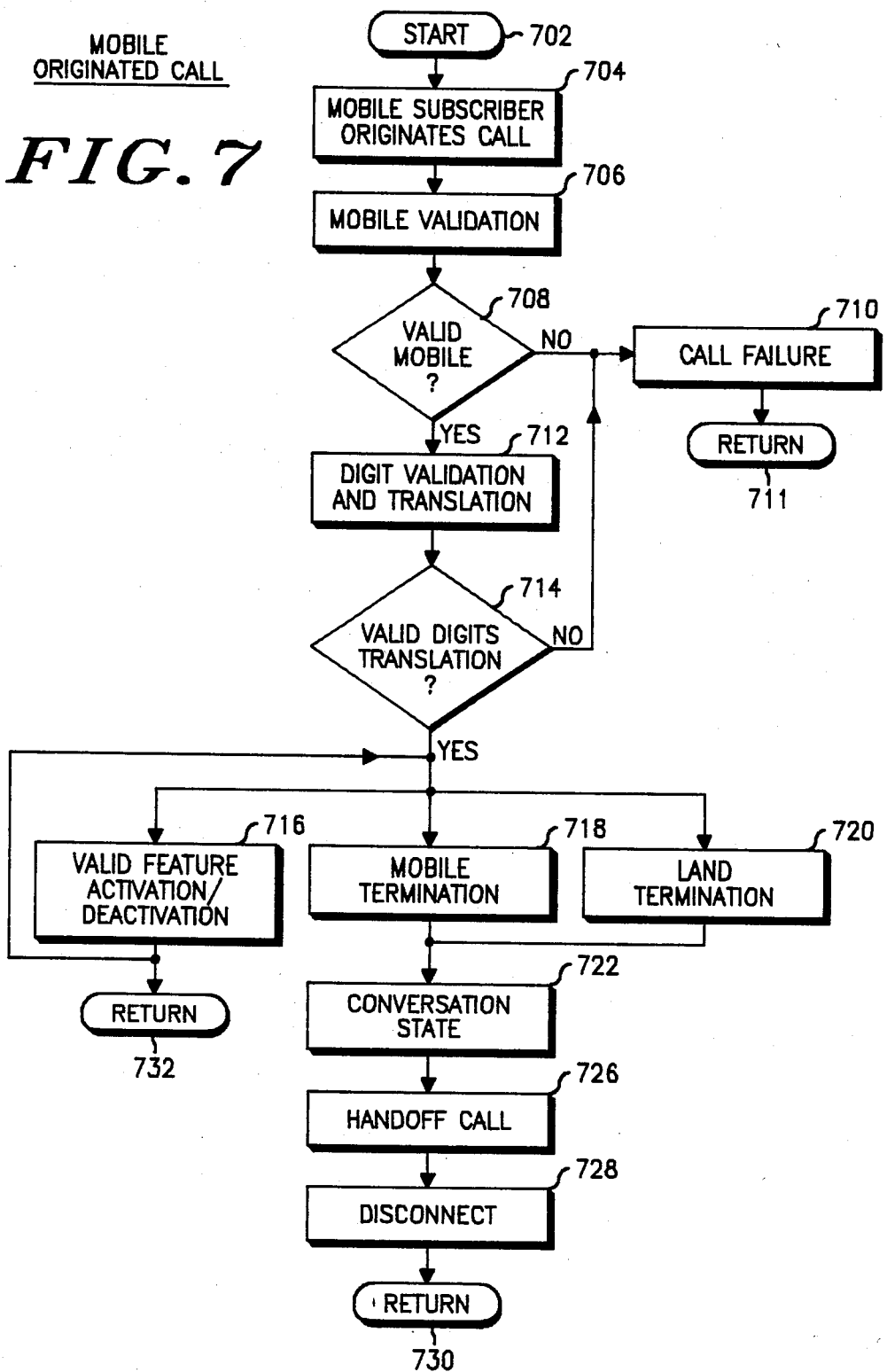
FIG. 7 is a flow diagram executed by the control terminal in FIG. 2 for processing a mobile originated call in a cellular system networked with at least one other cellular system.

Referring to FIGS. 7 and 8, there are depicted the typical call flow scenarios which occur in control terminal 420 of each networked cellular system in FIG. 2. Control terminal 420 executes the call processing flow diagram in FIG. 7 for mobile originations and the call processing flow diagram in FIG. 8 for land originations. The flow diagrams of FIGS. 7 and 8, together with related flow diagrams, are also shown and described in Motorola Instruction Manual No. 68P81150E06, entitled "DYNATAC Call Flow", published by Motorola Service Publications, 1301 East Algonquin Road, Schaumburg, Ill., in 1983.

Referring to FIG. 7, the call flow diagram for mobile originations is entered at block 702 and proceeds to block 704 where it is determined that a mobile has originated a call. Control terminal 420 receives the mobile identification number and the telephone number of the called party from the base site selected by the mobile. Next, at block 706, it is determined whether the mobile is a valid local mobile or a valid roaming mobile by accessing the subscriber data base 626 and/or the subscriber data base 430. In networked cellular systems, it is possible that the subscriber information for the originating mobile is not contained in the subscriber data base 626 of the control terminal that received the call. If not, the control terminal 420 will send a message to the other control terminals in the network or, if used, to centralized subscriber data base 430 to determine if the mobile is a valid mobile. This information is passed over the intersystem data lines which connect the networked cellular systems (see FIG. 1). At decision block 708, a check is made to determine if the mobile has been validated. It not, NO branch is taken from decision block 708 to block 710 where call flow is diverted to the call failure process. At this point, a recorded announcement or progress tone is sent to the mobile before it is disconnected.

If the mobile has been validated, YES branch is taken from decision block 708 to block 712 where the digits of the telephone number of the called party are validated before they are translated according to the dialing plan. If the telephone number is not valid, NO branch is taken to block 710 where call flow is diverted to the call failure process. If the telephone number is valid, YES branch is taken to blocks 716, 718 and 720 where the mobile call is terminated to a feature valid to the mobile, a called mobile party or a called land party, respectively. Then, at block 722, the conversation state is entered when the called party answers. During conversation, a handoff may be requested by the BSC 950 processing the cell. If a handoff is requested at block 726, call flow is diverted to the handoff call flow diagram in FIG. 10. Otherwise, conversation continues until either the mobile party or called party terminates the call at block 728. At block 728, the call is disconnected, and thereafter, control terminal 420 returns to block 730 to processing other tasks.

Referring to FIG. 8, next consider the scenario where someone on the land network is placing a call to a mobile in the networked cellular system in FIG. 2. A telephone central office 422 of the public switch telephone network (PSTN) will seize a trunk to control terminal 420. Once the trunk is seized, the PSTN will send the selected cellular system 101-103 the desired mobile's telephone number. When a trunk to the control terminal 420 is seized, the land originated call flow diagram of FIG. 8 is entered at block 760 and proceeds to block 762 where the digits of the telephone number of the called mobile are checked to determine if the called mobile is a valid subscriber. As explained above for a mobile originated call, the control terminal 420 accesses the subscriber data base 626 and/or the subscriber data base 430 to determine if the called mobile is a valid local mobile or a valid roaming mobile.

Next, at decision block 764, a check is made to determine if the telephone number of the called mobile has been validated. If not, NO branch is taken from decision block 764 to block 766 where call flow is diverted to the call failure process. At this point, a recorded announcement or progress tone is sent to the land party before it is disconnected.

If the mobile has been validated, YES branch is taken from decision block 764 to block 770 where the call is terminated to the called mobile. At this point, the called mobile is paged throughout the cellular system network. If mobile registration information is stored in the subscriber data base 626 or the subscriber data base 430, the called mobile may first be paged in the system in which the called mobile last registered. In paging the called mobile, each control terminal 420 will signal its BSCs that a call is waiting for the mobile. All the BSCs will generate and send a paging message on the signalling channel to the called mobile to inform the mobile that a call awaits.

Upon receiving the page, the mobile will rescan the signalling channels group to determine which is the strongest as was described hereinabove with respect to FIGS. 5 and 6. This insures that the mobile will signal in on the best available access or signalling channel. Once the strongest signalling channel is determined, the mobile acknowledges the paging message by transmitting an acknowledgement message on the signalling channel. The mobile's acknowledgement message is forwarded by the BSC to the control terminal 420 over the data line connecting the control terminal 420 and the BSC (see FIG. 2). Note that only one BSC will return the mobile's acknowledgement message to the control terminal 420. Therefore, the control terminal 420 knows the cell in which the mobile is located.

Once the mobile has acknowledged the page, the conversation state is entered at block 772. When the mobile answers, the call proceeds as a normal telephone conversation at this point. During conversation, a handoff may be requested by the BSC 950 processing the call. If a handoff is requested at block 776, call flow is diverted to the handoff call flow diagram in FIG. 10. Otherwise, conversation continues until either the mobile party or land party terminates the call at block 778. At block 778, the call is disconnected, and thereafter, control terminal 420 returns at block 780 to processing other tasks.

Figure 10:
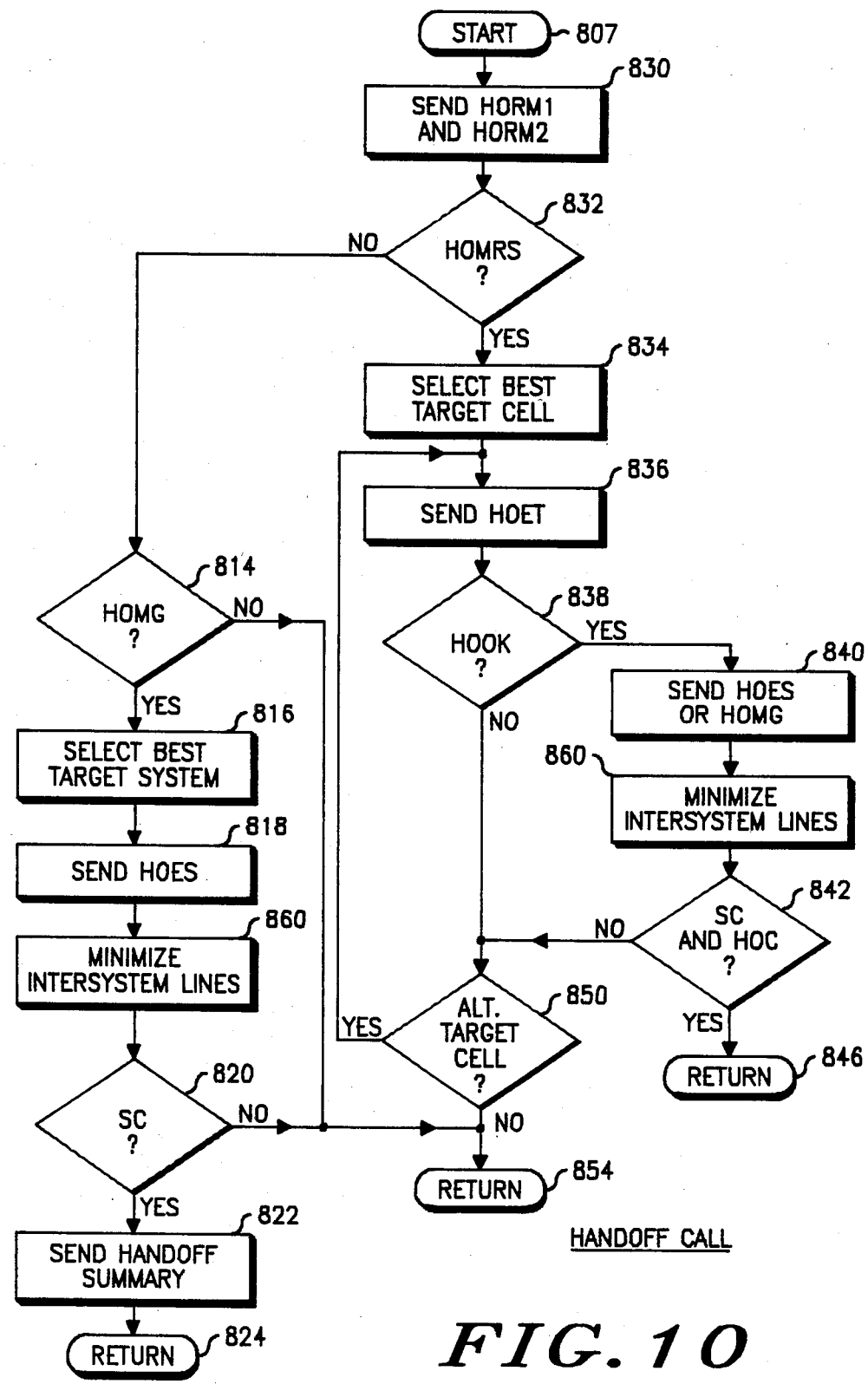
FIG. 10 is a flow diagram executed by the control terminal in FIG. 2 for processing a handoff in a cellular system networked with at least one other cellular system.

When a handoff is requested, call flow is diverted to the handoff flow diagram of FIG. 10. Handoffs are initiated when a BSC detects degradation in the mobile signal strength. The source BSC is monitoring the signal strength of the mobile to insure that sufficient signal strength can be received by the corresponding base site transceiver to permit the conversation to proceed satisfactorily. If the signal strength drops below a predetermined level (variable from cell to cell), the BSC will request a handoff. During handoff, adjacent BSCs measure the mobile's signal strength as received by the adjacent base site scanning receiver 910 in FIG. 4.

Upon receipt of a handoff request (HOR) from a source BSC, control terminal 420 enters the flow diagram of FIG. 10 at start block 802. The following discussion will assume that the handoff will occur from the source cell to a target cell of the same cellular system. At block 830, control terminal 420 identifies border cells, adjacent cells (called "target cells") and adjacent networked cellular systems (called "target systems") by accessing cell data base 624. A border cell is a cell of a networked cellular system which is adjacent to at least one border cell of another cellular system. Once adjacent cells and adjacent cellular systems have been identified, control terminal 420 sends a handoff measurement request (HOMR1) to identified adjacent cell sites. Assuming the requesting cell is not a border cell, control terminal will not send a handoff measurement request (HOMR2) to an adjacent cellular system. A scan receiver in these adjacent cell sites tunes it scanning receiver to the mobile's voice channel and will measure the mobile's signal strength. If the signal strength measurement taken by the scan receiver is acceptable and a voice channel is available, the target BSC will return this information to control terminal 420 along with the measured signal strength.

Next, at decision block 832, a check is made to determine if a handoff measurement response (HOMRS) has been received from the adjacent cell sites. If a handoff measurement response is not received within a predetermined time interval, NO branch is taken to block decision block 814 where a check is made to determine if a handoff go message (HOMG) has been received from an adjacent cellular system. Since control terminal 420 will not receive any handoff go messages, NO branch is taken to block 854 where control terminal 420 returns to other tasks.

If the mobile's signal strength remains low for a predetermined time interval, the source BSC will initiate another attempt to handoff the call. Additional handoff attempts will be made until the mobile's signal strength degrades to the point where the call is terminated by one of the parties or the supervisory audio tone can no longer be received. At this point, the control terminal 420 and the source BSC will disconnect the call.

If at least one handoff measurement response is received, YES branch is taken from decision block 832 to block 834 where the target BSC having the strongest measured signal strength is selected. Next, at block 836, a handoff execute message (HOET) is sent to the selected target BSC. Then, at decision block 838 check is made to determine if a handoff OK message (HOOK) has been received from the selected target BSC. If a handoff OK message is not received from the target BSC, NO branch is taken from decision block 838 to decision block 850 to check for an alternate target BSC. If a handoff measurement response has been received from another BSC, block 836 and 838 are repeated as described above. Otherwise, NO branch is taken from decision block 850 to block 854 to return to other tasks.

Returning to decision block 838, If a handoff OK message is received from the target BSC, YES branch is taken to block 840 where a handoff execute message (HOES) is sent to the source BSC and a handoff go message (HOMG) is sent if the source BSC is in an adjacent cellular system.

Next, at block 860, the control terminal 420 establishes and minimizes the necessary connections for executing the handoff. If the source BSC and target BSC are not in the same cellular system, control terminal 420 establishes a connection between an intersystem voice line and the target voice channel. If the source BSC and target BSC are in the same cellular system, control terminal 420 establishes a three way connection between the source voice channel, target voice channel and the port going to the PSTN for calls between a land and mobile part, and establishes a three way connection between the source voice channel and target voice channel for the mobile being handed off and the voice channel for the mobile not being handed off for calls between two mobile parties.

According to the present invention, the intersystem lines required for implementing a handoff are minimized by disconnecting the intersystem line when a call can be connected entirely within the same system and by connecting a call directly between the "pivot" system handling the other end of the call and the target cellular system rather than connecting the call through the intervening source cellular system. Call flow for the minimization process is illustrated in FIG. 9.

Referring to FIG. 9, call flow enters at block 302 and proceeds to decision block 304 where a check is made to determine if the pivot central processor CCP is the source CCP which requested the handoff. If so, YES branch is taken to return block 314 since the handoff and call can be connected entirely within the same system. If not, NO branch is taken to decision block 306 where a check is made to determine if the pivot CCP is the target CCP. If so, YES branch is taken to block 308 to disconnect the intersystem line between the pivot CCP and source CCP since the mobile being handed off is returning to the system that originated the call. If the pivot CCP is not the target CCP, NO branch is taken to block 310 where a termination is made on the intersystem line between the pivot CCP and the target CCP. Then, at block 312, the intersystem line between the source CCP and pivot CCP is disconnected thereby avoiding the source CCP in implementing the handoff.

Returning to FIG. 10, the handoff execute message (HOES) identifies the target voice channel to which the mobile is to tune. The source BSC sends a handoff order with this information to the mobile over the source voice channel by blanking the voice and substituting the handoff order in its place. When the mobile detects that signalling information is being sent, the receiver is muted so the mobile user will not hear the signalling burst. Transmission of the handoff order takes slightly over 250 msec. The mobile, upon receiving the handoff order, tunes to the target voice channel. When the mobile is returned to the target voice channel, it will send a burst of signalling tone over this channel to indicate to the target BSC that it has arrived. Once the signalling tone is detected at the target BSC, the target BSC sends a handoff complete message (HOC) to the control terminal 420 which drops the source voice channel from the three way connection. At this point, the call proceeds as normal. If a handoff complete message is received from the target BSC and a source clear message (HOC) is received from the source BSC, YES branch is taken from decision block 842 to return block 846. Thereafter control terminal 420 returns to other tasks.

In the networked cellular systems 101–103 in FIG. 1, the mobile may move from the coverage area of one cellular system to that of another. In this case, a handoff is requested by a source border cell. For example, a handoff from a source border cell 1A in cellular system 101 may be made to target border call 2B in cellular system 102. Returning to block 830 in FIG. 10, if the source BSC is in a border cell, control terminal 420 sends a handoff measurement request (HOMR1) to identified adjacent cell sites and identified adjacent cellular systems. Next, at decision block 832, a check is made to determine if a handoff measurement response (HOMRS) has been received from the adjacent cell sites. If so, YES branch is taken to block 834 to continue as described hereinabove. According to a novel feature of the present invention, handoffs to adjacent cells in the same cellular system as the source BSC are given preference to intersystem handoffs. That is, handoff is made to an adjacent cell before being made to an adjacent cellular system.

Assuming a handoff measurement response has not been received from the adjacent cell sites in the same cellular system as the source BSC, NO branch is taken to decision block 814 to determine if a handoff go message (HOMG) has been received. Handoff measurement request (HOMR2) messages may be sent to one or more adjacent cellular systems. The handoff measurement request (HOMR2) to adjacent cellular systems includes the source signal strength, a signal strength offset, the source voice channel and the source supervisory audio tone frequency. Control terminal 420 in each adjacent cellular system identifies its border cells adjacent to the source border cell by accessing its cell data base 624. A scan receiver in these adjacent border cell sites tunes it scanning receiver to the mobile's voice channel and will measure the mobile's signal strength. To be acceptable for handoff, the measured signal strength must be greater than the source signal strength plus the signal strength offset. The magnitude of the signal strength offset may be varied to insure that the signal strength in the target cell is better than that in the source cell. If the signal strength measurement taken by the scan receiver is acceptable and a voice channel is available, the target BSC will return this information to control terminal 420 along with the measured signal strength.

Returning to decision block 814, a check is made to determine if a handoff go message (HOMG) has been received from an adjacent cellular system. If a handoff go message is not received within a predetermined time interval, NO branch is taken to block 854 where control terminal 420 returns to other tasks.

If at least one handoff go message is received, YES branch is taken from decision block 814 to block 816 where the target cellular system having the strongest measured signal strength is selected. Next, at block 818, control terminal 420 sends a handoff execute message (HOES) to the source BSC. Then, at block 860, control terminal 420 establishes and minimizes a connection between an intersystem voice line and the source voice channel, as described hereinabove with reference to FIG. 9.

The handoff execute message identifies the target voice channel of the target cellular system to which the mobile is to tune. The source BSC sends a handoff order with this information to the mobile over the source voice channel. The mobile, upon receiving the handoff order, tunes to the target voice channel of the target cellular system. When the mobile is returned to the target voice channel, it will send a burst of signalling tone over this channel to indicate to the target BSC that it has arrived. Once the supervisory audio tone disappears at the source BSC, the source BSC sends a source clear message (SC) to the control terminal 420 which drops the source voice channel from the three way connection. At this point, the call proceeds as normal.

Next, at decision block 820, a check is made to determine if a source clear message has been received. If not, No branch is taken to return block 854. If a source clear message (HOC) is received from the source BSC, YES branch is taken to block 822 to send a handoff summary message to the target cellular system. The source control terminal transmits the accumulated billing record to the target control terminal. The target control terminal which handles the completion of the call will send the completed billing record back to the originating control terminal involved in the call if they are not one and the same. Thereafter, source control terminal 420 returns to other tasks at block 824.

The flow diagrams in FIGS. 5, 6, 7, 8, 9 and 10 provide a detailed description of the process steps executed by the corresponding processing circuitry of the mobile and control terminal. By way of analogy to an electrical circuit diagram, these flow diagrams are equivalent to a detailed schematic for an electrical circuit where provision of the circuitry for electrical circuit blocks corresponds to provision of actual computer instructions for the flow diagram blocks. Thus, the coding of the process steps of these flow diagrams into instructions of suitable commercially available computers is a mere mechanical step for a routineer skilled in the programming art.

Figure 11:
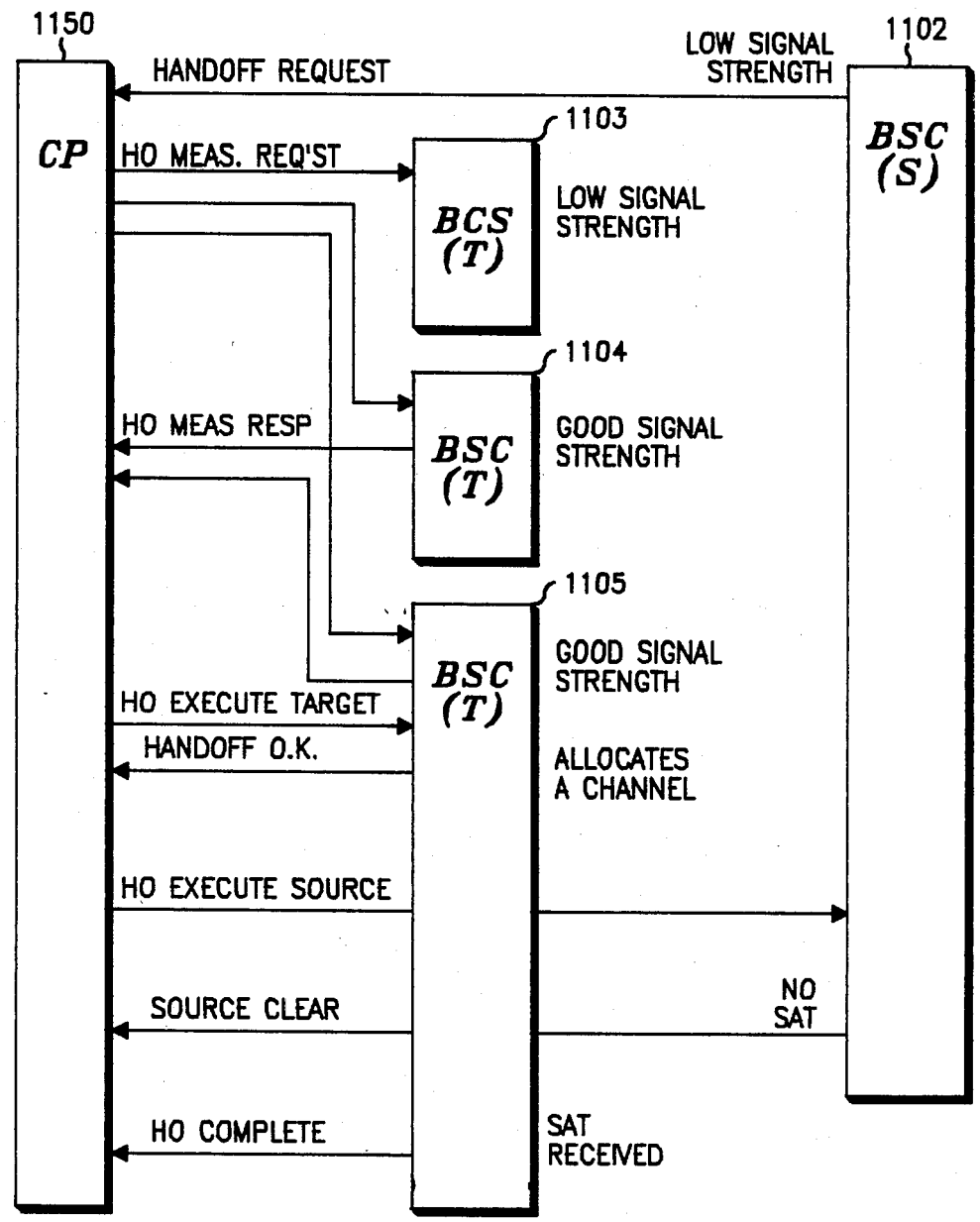
FIG. 11 is a flow diagram of a successful intrasystem handoff between cells within a cellular system networked with at least one other cellular system.

In FIG. 11, there is illustrated a message flow diagram for a successful intra-system handoff. The scan receiver of the source BSC 1102 determines that the received signal strength is below threshold. The source BSC 1102 sends a handoff request message (HOR) to the source central processor (CCP) 1150. The CCP 1150 receives the handoff request message (HOR) and checks the data base to identify adjacent cells and adjacent cellular systems. Assuming that only adjacent cells are identified, the CCP 1150 sends a type 1 handoff measurement request (HOMR1) to all identified adjacent BSCs 1103, 1104 and 1105.

Each adjacent BSC 1103, 1104 and 1105 receiving the handoff measurement request (HOMR1) determines if the mobile can be received sufficiently well to accept the handoff. The handoff measurment request (HOMR1) identifies the voice channel of the source BSC 1102 and includes the signal strength measurement taken by the source BSC 1102. Each BSC 1103, 1104 and 1105 tunes to the source voice channel, meassures the signal strength, and compares its measured signal strength measurement to the signal strength measurement of the source BSC 1102. In the case illustrated in FIG. 11, BSC 1105 determines that its signal strength measurement is better than the signal strength measurement of the source BSC 1102 and sends a handoff measurement response message (HOMRS) to the CCP 1150. The handoff measurement response message (HOMRS) includes the signal strength measurement of the target BSC 1105. The CCP 1150 receives the handoff measurement response messages (HOMRS), selects the target BSC with the largest signal strength measurement, and sends a handoff execute target message (HOET) to the best target BSC, here BSC 1105.

The BSC 1105 receives the handoff execute target message (HOET) and checks to see that a voice channel is available in the cell. If a voice channel is available, the BSC 1105 puts the channel in a busy state, sends a handoff OK message (HOOK) to the CCP 1150, and begins monitoring the available voice channel for supervisory audio tone from the mobile.

The CCP 1150 receives the handoff OK message (HOOK), indicating that a voice channel is available. The CCP 1150 then creates a three party connection between the voice channel of the source BSC 1102, voice channel of the target BSC 1105, and land party. When the three party connection has been created, CCP 1150 sends a handoff execute source message (HOES) to the source BSC 1102.

The source BSC 1102 responds by transmitting over its voice channel a handoff order indentifying the voice channel of the target BSC 1105 to the mobile. The mobile acknowledges by putting up the signalling tone for the required interval, tunes to the identified voice channel of the target BSC 1105, and transponds the supervisory audio tone. The source BSC 1102 detects the receipt of the signalling tone and monitors its voice channel for loss of mobile carrier. After the mobile has vacated the voice channel of the source BSC 1102, the voice channel is deactivated and a source clear message (SC) is sent by the source BSC 1102 to the CCP 1150.

The target BSC 1105 detects the supervisory audio tone from the mobile, puts its voice channel in conversation mode, and sends the CCP 1150 a handoff complete message (HOC). The CCP 1150, upon receipt of the handoff complete message (HOC), updates the mobile call records. The messages exchanged during foregoing handoff are summarized in the following Table I.

TABLE I

| Message | Direction | Notes/Data |
|---|---|---|
| Handoff Request | CCP ← BSC | Source BSC |
| Handoff Measurement Request | CCP → BSC | Target BSC |
| Handoff Measurement Request | CCP → BSC | Target BSC |
| Handoff Measurement Request | CCP → BSC | Target BSC |
| Handoff Measurement Request | CCP → BSC | Target BSC |
| Handoff Measurement Request | CCP → BSC | Target BSC |
| Handoff Measurement Request | CCP → BSC | Target BSC |
| Handoff Measurement Response | CCP ← BSC | Target BSC |
| Handoff Measurement Response | CCP ← BSC | Target BSC |
| Handoff Execute | CCP → BSC | Target BSC |
| Handoff OK | CCP ← BSC | Target BSC |
| Handoff Execute | CCP → BSC | Source BSC |
| Source Clear | CCP ← BSC | Source BSC |
| Handoff Complete | CCP ← BSC | Target BSC |

According to the present invention, handoffs to adjacent cells in the same cellular system as the source cell will be made before intersystem handoffs to an adjacent cellular system. That is, if good measurements are received from a local BSC and another cellular system, the handoff will be made to the local BSC, regardless of signal strength. The scenario that follows assumes that either there is no good signal strength from local BSC's, or that there are no local BSC candidates for measurement requests.

Figure 12:
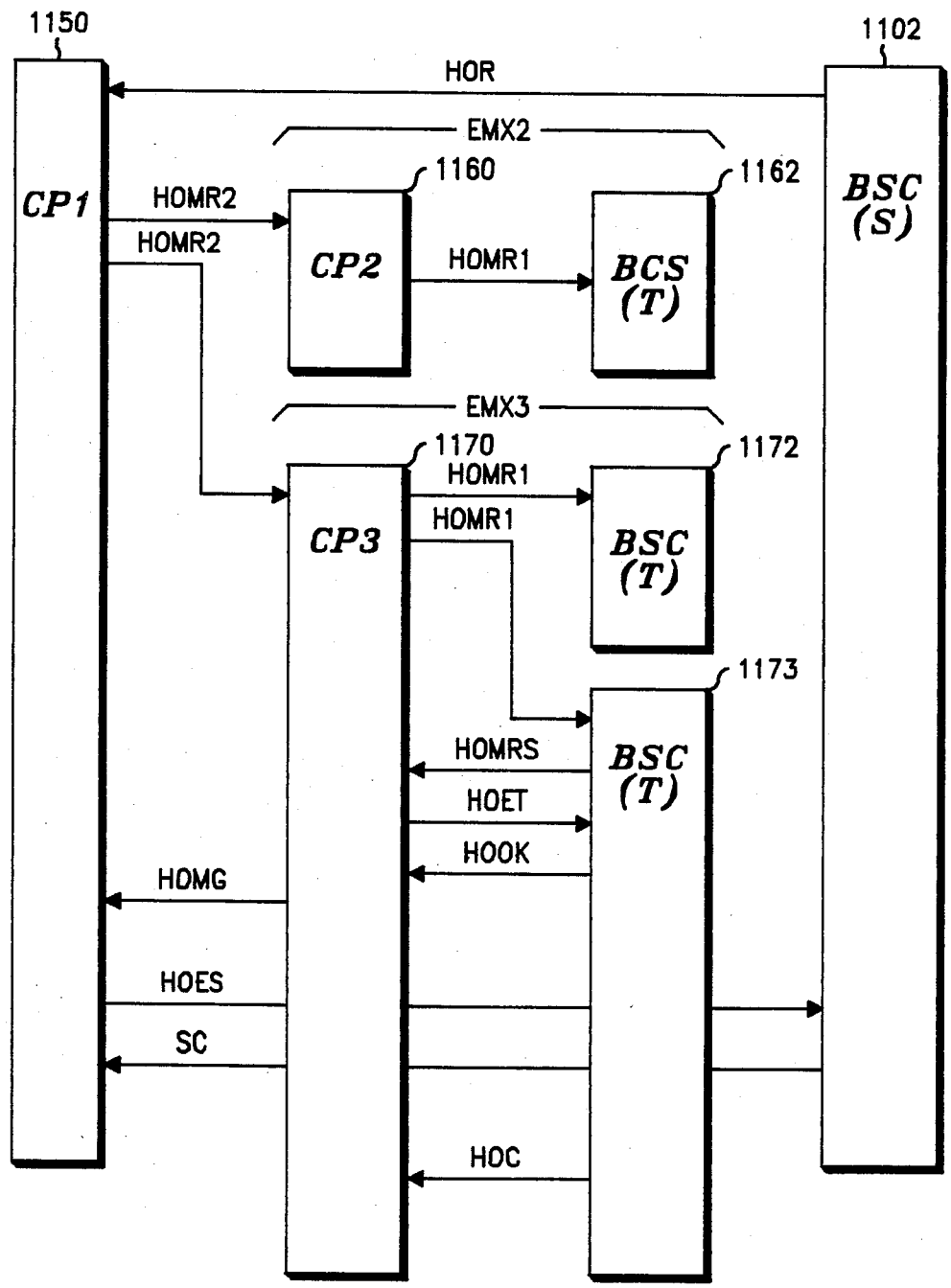
FIG. 12 is a flow diagram of a successful intersystem handoff between cells of networked cellular systems illustrating a feature of the present invention.

Referring to FIG. 12, the scan receiver of the source BSC 1102 determines that the received signal strength is below threshold. The source BSC 1102 sends a handoff request message (HOR) to source control terminal (CCP1) 1150. CCP1 1150 receives the handoff request message and checks its data base to identify adjacent cells and adjacent cellular systems. Assuming that both adjacent cells and adjacent cellular systems have been identified, CCP1 1150 first sends type 1 handoff measurement requests (HOMR1) to all identified adjacent BSCs (see Table II) and sends type 2 handoff measurement requests (HOMR2) to all identified adjacent cellular systems.

Each adjacent BSC receiving the handoff measurement request determines if the mobile can be received sufficiently well to accept the handoff. In this case, it is assumed that none of the adjacent BSCs can accept the handoff. The adjacent cellular systems CCP2 1160 and CCP3 1170 receive the handoff measurement requests and check their data bases for adjacent border cells. CCP2 1160 and CCP3 1170 send type 1 handoff measurement requests to all identified adjacent border BSCs 1162, 1172 and 1173.

Each adjacent border BSC 1162, 1172 and 1173 receiving the handoff measurement request determines if the mobile can be received sufficiently well to accept the handoff. In this case, BSC 1173 sends a handoff measurement response message (HOMRS) to the CCP3 1170. CCP3 1170 receives the handoff measurement response message and sends a handoff execute target message (HOET) to BSC 1173. BSC 1173 receives the handoff execute target message and checks to see that a voice channel is available in the target border cell.

If a voice channel is available, BSC 1173 puts the available voice channel in a busy state, sends a handoff OK message (HOOK) to CCP3 1170, and begins monitoring the available voice channel for SAT. CCP3 1170 receives the handoff OK message, indicating that a target voice channel is available. It sends a handoff measurement good message (HOMG) to CCP1 1150.

CCP1 1150 receives the handoff measurement good message from CCP3 1170 and checks to see if an intersystem handoff is possible. If the intersystem handoff is possible, CCP1 1150 creates a three party connection between the source voice channel of the source BSC 1102, the land party and the network line to the cellular system of CCP3 1170. When the three party connection has been created, CPP1 1150 sends a handoff execute source message (HOES) to the source BSC 1102.

BSC 1102 responds to the handoff execute source message by transmitting the handoff order and target voice channel assignment to the mobile. The mobile acknowledges by putting up the signalling tone for the required interval, tunes to the target voice channel, and transponds SAT. BSC 1102 detects the receipt of the signalling tone and monitors its voice channel for loss of mobile carrier. After the mobile has vacated the voice channel, the voice channel is deactivated by BSC 1102. BSC 1173 detects the supervisory audio tone from the mobile, puts its voice channel in conversation mode, and sends a handoff complete message (HOC) to CCP3 1170.

The CCP3 1170, upon receipt of the handoff complete message, updates its mobile call records and sends a condensed handoff summary message to CPP1 1150. The messages exchanged during foregoing intersystem handoff are summarized in the following Table II.

TABLE II

| Message | Via Network | Direction | Notes/Data |
|---|---|---|---|
| HOR | N | CCP1 ← BSC(S) | Not strong enough |
| HOMR1 | N | CCP1 → BSC(T) | Not strong enough |
| HOMR1 | N | CCP1 → BSC(T) | Not strong enough |
| HOMR2 | Y | CCP1 → CCP2 | Intersystem handoff |
| HOMR2 | Y | CCP1 → CCP3 | Intersystem handoff |
| HOMR1 | N | CCP2 → BSC(T) | Not strong enough |
| HOMR1 | N | CCP3 → BSC(T) | Not strong enough |
| HOMR1 | N | CCP3 → BSC(T) | Strong enough |
| HOMRS | N | CCP3 ← BSC(T) | Channel available |
| HOET | N | CCP3 → BSC(T) | Execute handoff |
| HOOK | N | CCP3 ← BSC(T) | Allocates channel |
| HOMG | Y | CCP1 ← CCP3 | Handoff OK |
| HOES | N | CCP1 → BSC(S) | Handoff order to mob |
| SC | N | CCP1 ← BSC(S) | Channel vacated |
| HOC | N | CCP3 ← BSC(T) | Mobile on channel |

In summary, an improved method and apparatus for networking adjacent cellular systems has been illustrated and described which utilizes unique processes for mobile handoff and registration throughout the network. Intersystem handoffs are minimized by first making a handoff to a cell in the same cellular system as the source cell. Mobile registration automatically takes place when a mobile moves from one paging area to another. Therefore, while a particular embodiment of the invention has been shown and described, it should be understod that the invention is not limited thereto since modifications unrelated to the true spirit and scope of the invention may be made by those skilled in the art. It is therefore contemplated that our patent cover the present invention and any and all such modifications by the claims of the present invention.

We claim:

1. A method of controlling handoff of radiotelephones moving from source cells of one radiotelephone system toward an adjacent radiotelephone system, each radiotelephone system covering a different geographical area and having a plurality of cells for providing radiotelephone service to its corresponding geographical area, each cell having a plurality of radio channels and a radio coverage area established by fixed site radio apparatus, and each radiotelephone capable of handoff from a radio channel of one cell to a radio channel of another cell, said method comprising the steps of:

requesting a handoff in a source cell when the radiotelephone signal strength is less than a predetermined signal strength;

identifying adjacent cells of said one radiotelephone system when a handoff is requested;

determining if one of the identified adjacent cells is available for handoff;

determining if the adjacent radiotelephone system is available for handoff if one of the identified adjacent cells is not available; and executing a handoff to the available one of the identified adjacent cells and the adjacent radiotelephone system.

2. A method of controlling handoff of radiotelephones moving from source cells of one radiotelephone system toward an adjacent radiotelephone system, each radiotelephone system covering a different geographical area and having a plurality of cells for providing radiotelephone service to its corresponding geographical area, each cell having a plurality of radio channels and a radio coverage area established by fixed site radio apparatus, and each radiotelephone capable of handoff from a radio channel of one cell to a radio channel of another cell, said method comprising the steps of:

requesting a handoff in a source cell when the radiotelephone signal strength is less than a predetermined signal strength;

identifying border cells and adjacent cells of said one radiotelephone system when a handoff is requested;

measuring the radiotelephone signal strength in identified adjacent cells and in the adjacent radiotelephone system when the source cell is identified as a border cell;

executing a handoff to an identified adjacent cell if the measured radiotelephone signal strength exceeds the radiotelephone signal strength measured in the source cell; and executing a handoff to the adjacent radiotelephone system if the measured radiotelephone signal strength in the adjacent radiotelephone system exceeds the radiotelephone signal strength measured in the source cell and the measured radiotelephone signal strength in each identified adjacent cell does not exceed the radiotelephone signal strength measured in the source cell.

3. A method of controlling handoff of radiotelephones moving from source cells of one radiotelephone system toward an adjacent radiotelephone system, each radiotelephone system covering a different geographical area and having a plurality of cells for providing radiotelephone service to its corresponding geographical area, each cell having a plurality of radio channels and a radio coverage area established by fixed site radio apparatus, and each radiotelephone capable of handoff from a radio channel of one cell to a radio channel of another cell, said method comprising the steps of:

requesting a handoff in a source cell when radiotelephone signal strength is less than a predetermined signal strength;

identifying border cells and adjacent cells of said one radiotelephone system when a handoff is requested;

sending a measurement request signal to the identified adjacent cells when handoff is requested and to the adjacent radiotelephone system when the source cell is identified as a border cell;

sending a measurement response signal if the radiotelephone signal strength measured in an adjacent cell or in the adjacent radiotelephone system exceeds the radiotelephone signal strength measured in the source cell;

selecting an adjacent cell from which a measurement response signal is received;

selecting the adjacent radiotelephone system if a measurement response signal is not received from an adjacent cell and a measurement response signal is received from the adjacent radiotelephone system; and executing a handoff to the selected one of the adjacent cells and adjacent radiotelephone system.

4. The method according to claim 3, wherein said step of selecting an adjacent cell further includes the step of selecting the adjacent cell having the largest measured signal strength when a measurement response is received from more than one adjacent cell.

5. The method according to claim 3, wherein said step of sending a measurement response signal includes the step of sending a measurement response signal if the radiotelephone signal strength in the adjacent radiotelephone system exceeds the radiotelephone signal strength in the source cell by a predetermined amount.

6. The method according to claim 1, wherein said one radiotelephone system and said adjacent radiotelephone system are interconnected by communications lines, said handoff executing step further including the step of selecting one of the communications lines for said handoff.

7. The method according to claim 6, wherein said one radiotelephone system and said adjacent radiotelephone system are further each connected by communications lines to a third radiotelephone system, said method being repeated for a handoff from said adjacent radiotelephone system to said third radiotelephone system, and said repeated handoff executing step further including the steps of:

disconnecting said selected one of the communications lines between said one radiotelephone system and said adjacent radiotelephone system; and selecting one of the communications lines between said adjacent radiotelephone system and said third radiotelephone system.

8. The method according to claim 6, wherein said method is repeated for a handoff from said adjacent radiotelephone system back to said one radiotelephone system, said repeated handoff executing step further including the step of disconnecting said selected one of the communications lines.

9. The method according to claim 2, wherein said one radiotelephone system and said adjacent radiotelephone system are interconnected by communications lines, said handoff executing step for handoff to the adjacent radiotelephone system further including the step of selecting one of the communications lines for said handoff.

10. The method according to claim 9, wherein said one radiotelephone system and said adjacent radiotelephone system are further each connected by communications lines to a third radiotelephone system, said method being repeated for a handoff from said adjacent radiotelephone system to said third radiotelephone system, and said repeated handoff executing step for handoff to the adjacent radiotelephone system further including the steps of:

disconnecting said selected one of the communications lines between said one radiotelephone system and said adjacent radiotelephone system; and selecting one of the communications lines between said adjacent radiotelephones system and said third radiotelephone system.

11. The method according to claim 9, wherein said method is repeated for a handoff from said adjacent radiotelephone system back to said one radiotelephone system, said repeated handoff executing step for handoff to the adjacent radiotelephone system further including the step of disconnecting said selected one of the communications lines.

12. The method according to claim 3, wherein said one radiotelephone system and said adjacent radiotelephone system are interconnected by communications lines, said handoff executing step further including the step of selecting one of the communications lines for said handoff.

13. The method according to claim 12, wherein said one radiotelephone system and said adjacent radiotelephone system are further each connected by said communications lines to a third radiotelephone system, said method being repeated for a handoff from said adjacent radiotelephone system to said third radiotelephone system, and said repeated handoff executing step further including the steps of:

disconnecting said selected one of the communications lines between said one radiotelephone system and said adjacent radiotelephone system; and selecting one of the communications lines between said adjacent radiotelephone system and said third radiotelephone system.

14. The method according to claim 12, wherein said method is repeated for a handoff from said adjacent radiotelephone system back to said one radiotelephone system, said repeated handoff executing step further including the step of disconnecting said selected one of the communications lines.

* * * * *

UNITED STATES PATENT AND TRADEMARK OFFICE
CERTIFICATE OF CORRECTION

PATENT NO. : 4,737,978
DATED : April 12, 1988
INVENTOR(S) : Michael Burke et al

It is certified that error appears in the above-identified patent and that said Letters Patent is hereby corrected as shown below:

On the title page

In the Abstract

On line 9, delete "(402, 404 406)" and insert --(412, 414, 416) --.

Signed and Sealed this

Twenty-fifth Day of October, 1988

Attest:

DONALD J. QUIGG

Attesting Officer     Commissioner of Patents and Trademarks